Patented Jan. 20, 1942

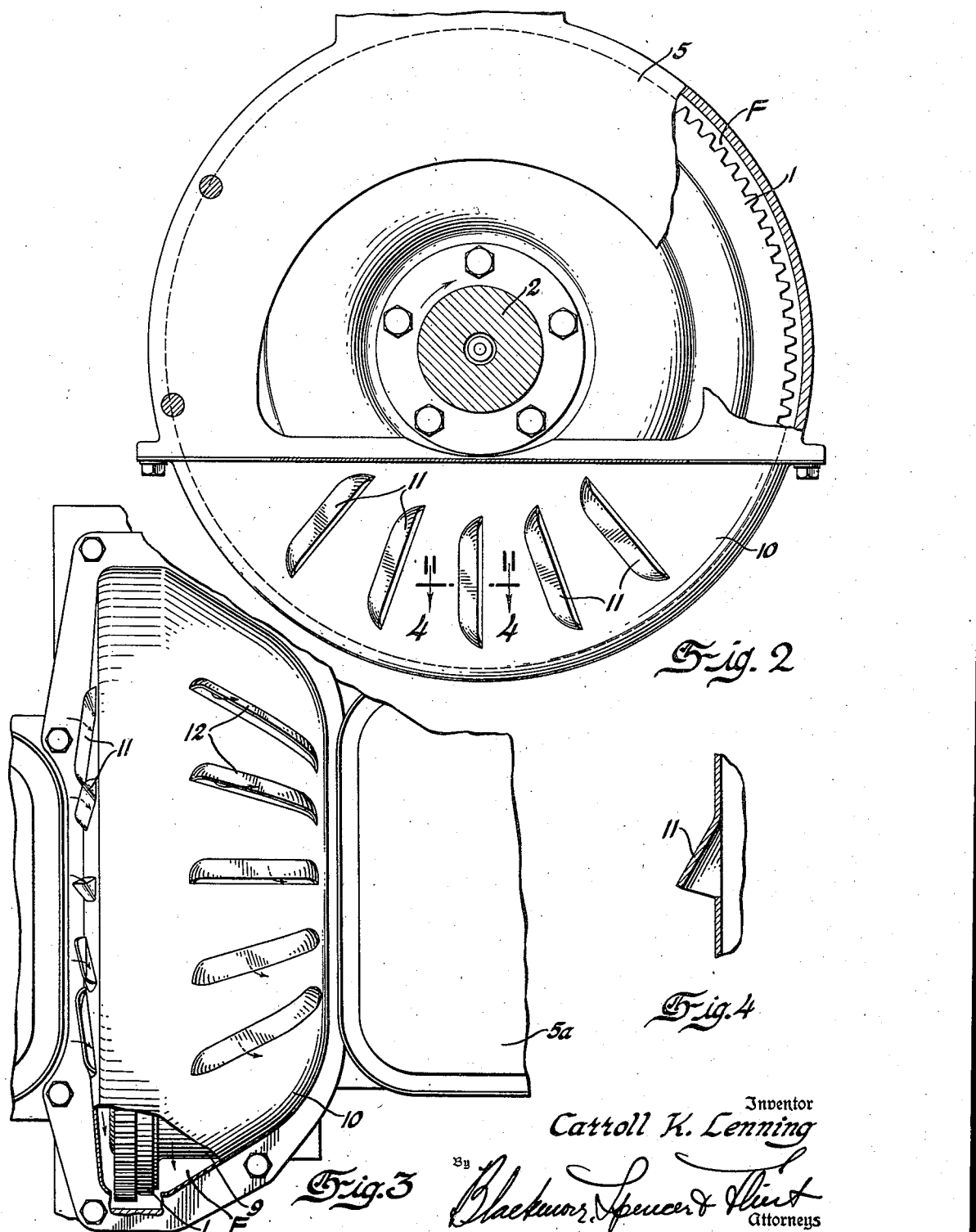

2,270,536

UNITED STATES PATENT OFFICE 2,270,536

TRANSMISSION DRIVE COOLING SYSTEM

Carroll K. Lenning, Lansing, Mich., assignor to General Motors Corporation, Detroit, Mich., a corporation of Delaware Application February 17, 1940, Serial No. 319,561

16 Claims. (Cl. 74—189.5)

The invention relates to cooling systems for variable speed power transmissions, and more particularly to such motor drive installations having fluid turbine mechanisms for handling vehicle driving torque.

The object of the invention is to provide a cooling system for the fluid drive and for the variable speed transmission in which the heat generated by the slip of the fluid unit and by the rotation of power transmission parts is transferred through a common oil bath, pressure fed to radiation or exchange means subject to constant flow of conducting air.

A further object is to provide a power transmission assembly equipped to yield a constant circulation of lubricating and cooling oil through a closed system containing in the path of flow, a heat exchange means or member subject to constant air flow induced by the rotation of said means or member.

A specific object is to provide a power transmission assembly having incorporated therein a fluid flywheel arranged with respect to a rotatable drum member thereof adapted to act as a heat exchanger between a liquid flowing within said member and a constantly moving mass of air circulated outside of said drum member by its rotation.

It is well known in this art to provide special cooling means for fluid flywheel units in order to extend the utility of such units in motor car, vehicle or boat installations. It is likewise a fact that because of space restrictions, and cost, the advent of the fluid flywheel as a feature in motor car assemblies has been retarded, in that adequate cooling for dissipation of slip-loss heat has required in the past a considerable expense for accessory cooling equipment.

The present invention therefore is directed toward a solution of the problem of maintaining a tolerable and reasonably uniform temperature condition in the fluid flywheel assembly and associated structure, by means of the features and objects noted above.

These and other desirable objects of the invention are obtained through the novel arrangement and construction and the improved combination with the accompanying drawings, in conjunction with the description of the following specification, in which:

Figure 2 is a vertical sectional view of the assembly of Figure 1 taken at 2—2 of that figure.

Figure 3 is a view taken from below of the enclosure pan for the engine flywheel housing.

Figure 4 is a part sectional view of one of the louvers of the air flow control system of the invention taken at 4—4 of Figure 2.

Figure 1:
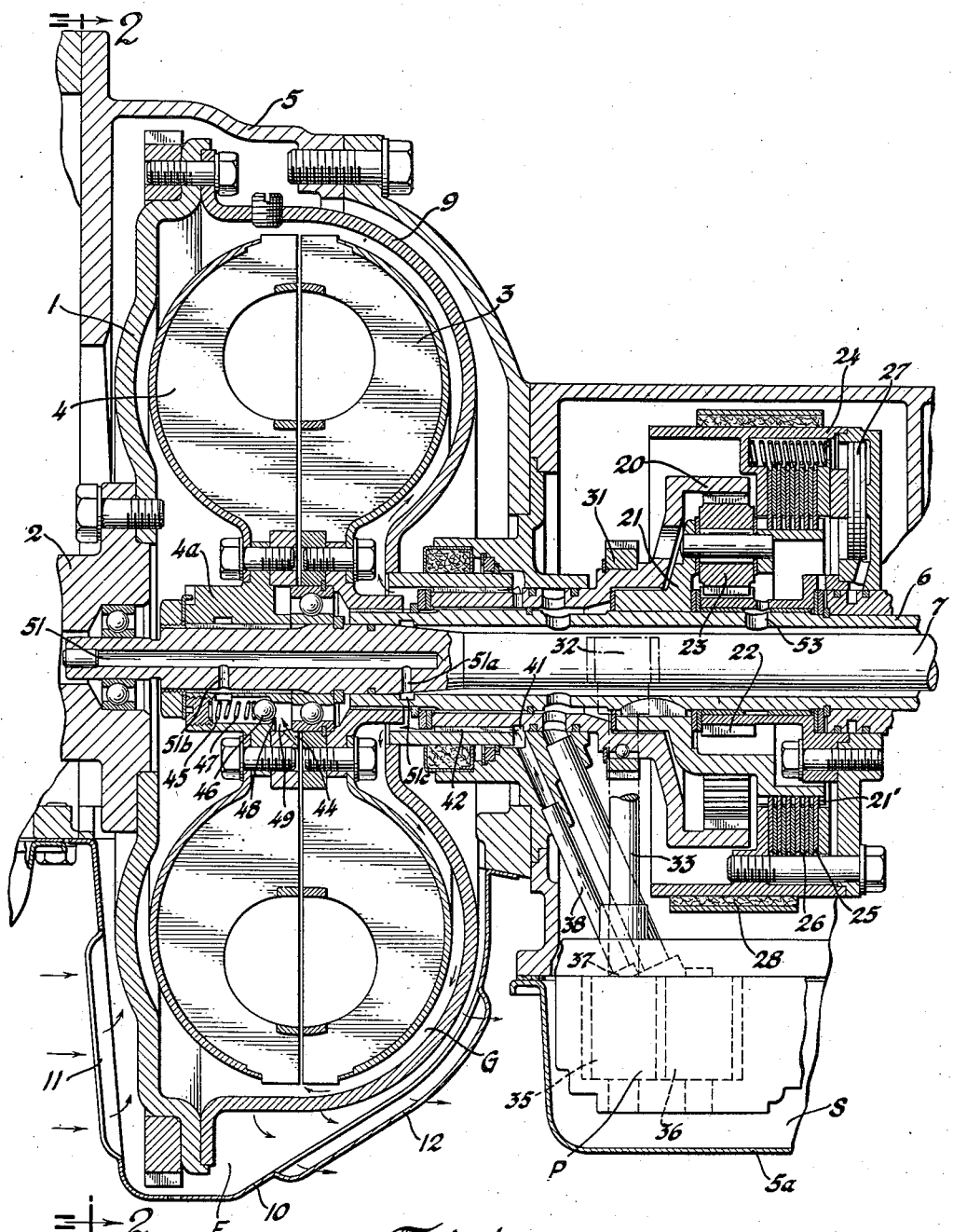
Figure 1 is a vertical cross-section of a variable speed transmission assembly equipped with the invention, and shows an engine-connected drum connected through gearing to drive a fluid turbine unit, commonly known as a fluid flywheel.

Referring to Figures 1 and 2, the engine flywheel casing lower jacket 10 is composed of sheet metal fastened to the bell housing 5 by appropriate means.

Louvers 11 are in effect radial slots cut in the jacket 10. Their opening with respect to the normal direction of motion of the vehicle, and the normal rotation of the elements within the jacket 10, is such that the air entering the louvers 11 is directed circumferentially into the space F immediately adjacent the spinning drum 9, in the normal direction of rotation of the latter.

From the well-known physical laws, the skin-friction air drag effect is accentuated by the arrangement described, the air blast caused by movement of the vehicle being converted from straight line flow to rotational flow within the space formed by the casing 5 and jacket 10.

Figure 2 describes the manner of cutting the radial louvers 11, at the engine side or front portion of the jacket 10, it being assumed that the normal hand of rotation of the engine connected drum 9 is clockwise when viewed from the front of the vehicle, as shown by the arrow on the shaft hub 2.

Because of the well-known effect of centrifugal force, the zone of greater air pressure within the jacket 10 is at the periphery of the drum 9, so that while the outside air below the power plant is flowing into the louvers 11, more or less axially with respect to the power plant shaft center, upon passing inside of the jacket 10, it not only receives a rotational component, but likewise a radial component. The flow of air entering the jacket 10 and directed over the drum 9 therefore is given a sweeping movement having a rotational component and a centrifugal force effect.

The preceding explanation of the action of the flow of air has had to do with the incoming blast of cool air, and with what happens to it when it enters the primary circulation space F of the jacket 10.

The rear portion of jacket 10 is likewise louvered at 12, in the same manner that the front portion is louvered at 11, as shown in Figure 3.

The louvers 12 open out from the space F between the drum 9 and the jacket 10 and casing 5 so that the rotational force of the air mass within the space may be converted into outward flow, restored to approximate line motion, somewhat similar to the character of the inflow conversion discussed above, but of course inverted in principle. It must be remembered that for the working cycle of the flow arrangement of the invention, wherein the maximum flow effect is experienced, the vehicle is in motion.

It will be understood that on the forward face of the jacket 10, the flow of outside air will create a pressure, and that on the rearward face, a suction. This differential of pressure is helpful, and adds to the ability of the spinning drum 9 and the louvering system to establish a positive flow through the casing 5 and jacket 10, and thereby transfer heat from the drum 9 to the outside air.

When the vehicle is standing still, the louvering system is enabled to function while the engine is rotating, due to the drum skin-friction effect, but of course, without the assistance of the external air presure differential discussed above. In still air, the rotation of the drum 9 generates an inflow in louvers 11, 12, because of their aperture with respect to the direction of rotation. The spinning mass of air inside the jacket 10 and casing 5 imparts a movement to the adjacent air masses in the mouths of the louvers 11, which because of their shape, tend to exert a suction on the outside air. Simultaneously, the outward opening of louvers 12 on the rear of jacket 10, with respect to the direction of rotation of the inner air mass, allows an increment of that mass to escape.

Having an inflow tendency on the front face, and an outflow tendency on the rear face of the jacket 10 provides a net movement of air through the space F external to drum 9 within the jacket 10 and casing 5, thereby cooling the drum 9.

Figure 1 shows a fluid flywheel assembly associated with an engine flywheel 1 bolted to drum 9 splined to sleeve 2a carrying annulus gear 20. The planetary gear unit of Figure 1 has no particular part in the present invention, but is shown in U. S. S. N. 124,283 to Kelley, filed February 5, 1937, now matured as U. S. 2,176,138, as a part of the driving arrangement of that invention.

Rotor 3 of the fluid turbine clutch is attached to the forward flange of hollow shaft 6 fixed to carrier 21 of the gear unit. Sun gear 22 meshing with planets 23 on spindles supported in carrier 21, is fixed to brake drum 24, having clutching engagement with carrier 21' through the agency of plates 25 and 26, actuated by fluid pressure supplied to pistons 27 through appropriate control means, fed by pump 35, 36, to be described later.

Central shaft 7 is affixed to fluid flywheel rotor 4, and its farther end encompasses connection to driving gearing not a part of this invention but shown in the above noted Kelley patent. Likewise, hollow shaft 6 is joined with said latter driving gearing.

Sleeve 2 has affixed pump driving gear 31 meshing with gear 32 of vertical shaft 33, pinned to gear 35 of gear pump P immersed in the oil sump S of the casing 5. Pump idler 36 meshes with gear 35, the pressure space 37 connecting to pipe 38 feeding annular space 41, opening to bearing passages 42 between the sleeve of drum 9 and the web of casing 5.

Oil under pressure from pump pressure space 37 follows the described path indicated by the arrows in Figure 1 to the space G inside drum 9 and surrounding the rotors 3 and 4.

Since the space G is maintained under positive pressure, the oil in this space flows into the inner pocket or torus formed by the rotors 3 and 4, through the parting zone between the rotors.

Hub 4a of rotor 4 is drilled out radially at 44; and longitudinally at 45 to accommodate valve check ball 46 and spring 47, the ball seating on seat 48 against the oil pressure existing in space 49 connecting with the interior pocket formed by the rotors 3 and 4.

Central shaft 7 is centrally drilled at 51 and radially drilled at 51a open to annular space 51c connecting with exit passages for lubrication along shaft 7.

The radial passage 51a is open at 51c to the axial cylindrical space between shaft 7 and hollow shaft 6 from whence oil may pass through various bearings and return to the transmission sump for recirculation by pump 35—36.

Overpressure in the toroidal rotor space greater than that which check valve spring 47 can resist causes ball 46 to move from seat 48 and thereby relieve the pressure back to the sump.

As will be understood, the variations in speed of the engine will be repeated in variations in the speed, and in pressure generated by the pump.

Furthermore, changes in the operation of the variable speed gear, namely, actuation of the brake 28 on drum 24 and clutch 25—26, will impart variable rotation to the fluid flywheel rotor 3. Since the pump P driven by the engine maintains the fluid flywheel filled with transmission oil, and since the operation of the fluid flywheel causes inherent variations in the net pressure within the toroidal working space, the check valve 46 is operating a very considerable portion of the time, the strength of spring 47 and the area of seat 48 being so taken with respect to the mean back pressure on the relief side, and the mean pump delivery pressure value; that a constant changing of the oil within the toroidal rotor pocket occurs.

The pump 35, 36, likewise lubricates under forced-feed the transmission gearing, for example, through radial passage 51b feeding the space between shafts 6 and 7, and also drilling 53 in shaft 6, whence the gears of the unit 20—22—23, and 31 with the associated bearings not numbered, receive the flow, the spent-pressure oil dropping back into the sump S for recirculation.

Heat generated in this portion of the assembly is spread out through the body of oil in sump S, dissipated by radiation from pan 5a, and casing 5, in part, and further dissipated by the positive air flow through louvers 11, 12, passing over drum 9.

The large area of the drum 9 is a satisfactory air exposure surface, and the narrow oil space G within the drum 9 provides a reasonable thinness of oil film for maximum interchange of heat from film to drum.

Experience has taught that the fluid flywheel operating with liquid constantly confined tends to heat up to beyond the vapor point of customarily used liquids, and while the present invention is adaptable to such sealed units, it is of particular utility when combined with systems having positive, constant circulation of the "driving" liquid. This is true because the cooling factor required for proper operation is proportional for a considerable distribution of excess heat through the whole body of the sump oil, making the conduction requirement for the mass of air passed through the louvers 11, 12, a readily provided one within the limits of good design for space allotment in the vehicle.

It should be remembered that the specific heat of oils such as used in motor car transmissions is more than double that of an equal volume of air. With constant recirculation of oil by the pump 35, 36, the oil pan 5a and casing 5 become useful secondary radiators for heat extracted from the fluid flywheel torus. It is assumed, of course, that general knowledge exists of the fact that the fluid flywheel functions as a driving device because of the slip between its rotors. Energy loss due to slip must be dissipated in more or less direct ratio to the degree of slip, if the mechanism is to operate under stable heat conditions. For this reason, ways and means to dispose of, control and stabilize the heat generated, are important.

In applying the present invention to a fluid flywheel system having no positive oil circulation to assist in the disposal of excess heat, it may be necessary to utilize a somewhat different form of construction in which a larger degree of air flow may be had, such as by louvering similarly the external casing 5 where it projects into the engine fan air stream beyond the contour of the engine itself.

It is not deemed necessary to show this feature in the drawings, it being obvious that the flywheel housing portion of the conventional motor car power plant is of larger general diameter than the width of the engine portion. Since the direction of flow of engine fan propelled air is customarily from the front of the engine toward the rear, where the flywheel housing is placed, the motion of air passing over the casing, even though warmed by the engine itself, still possesses heat absorption capacity. It is likewise within the purview of my invention to draw the engine cooling air over the flywheel and transmission housings before passing it through the heat exchange system; that is, in vehicle power plants placed at the rear, such as described in U. S. 2,048,959 to R. Thompson, patented July 28, 1936. In this way the external air is fed first to the space adjacent the fluid flywheel of the present invention, adding to the ability of the system of the invention to extract heat from the fluid flywheel housing. A similar system is shown in U. S. 2,038,581 to Lent, patented April 28, 1936.

The dual cooling resulting from the construction of the version illustrated in the drawings accompanying the present specification, by means of the constant circulation of lubrication oil as a heat transfer medium, and by means of the louver system described for constant circulation of cooling air when the engine is running, is believed to constitute a useful improvement in this art. Ordinary air flow cooling has been shown by others who have utilized external fins on casings containing the fluid flywheel construction; special systems for circulating coolant in the walls of such casings and through various chambers have been described; and also engine cooling system water has been used for a driving fluid, as well as sea water, in a boat installation.

The present invention is simple. It is not complicated by necessary connection with other cooling adjuncts, but is adaptable to augment the cooling effect required for any form of fluid flywheel construction, and has, of course, special adaptability to constructions wherein a constant liquid flow is maintained by other means. To make this point explicit, as demonstrated by the drawings of the present specification, the drum 9 receives a constant supply of oil from pump 35, 36, fed into the space G between it and the rotors. This oil must flow outward along the inner surface of the drum and along the external surfaces of the rotors. The space is relatively narrow in radial cross-section, so that the body of oil is spread out, facilitating the exchange of heat from the oil through the body of drum metal to the circulated air mass of the louver system. The heat exchange takes place on a dynamic cycle rather than on a static cycle, for the constant circulation of the oil film brings in a fresh body of oil to the drum while the circulation of air is causing a renewed external heat exchange action. In both heat transfers, the exchange may be considered as a dynamic, as compared with a static process. In tracing the slip induced heat, it is considered as beginning at the parting zones between the rotors 3, 4, and from thence the oil flow extracts heat from the metal of the rotors themselves, carrying the fluid out through the check valve passages 45, 44, 51b, 51 to the lines leading to the sump where the unit heat charge of the oil is spread out over the whole body of sump oil. This heat drop assists the cooling action tending to stabilize the quantity of heat passing through the pump-connected system to the cooling space F between the rotors and the drum 9. Here the action is one of positive heat extraction, whereas the action in the sump is one of spreading out, assisted, however, by the heat dissipation ability of the transmission casing 5 and bottom pan 5a.

Actual experience with the system of the present invention has proven the beneficial result of the construction shown in the drawings. A definite acceleration of outward flow of undesired heat occurs with this arrangement compared with the identical structure minus the air louvering system of the showing.

The present invention is believed therefore to mark a measurable improvement in the cooling facilities of power plants equipped with fluid flywheels, which improvement is accentuated by the space limitations for power plants in modern motor vehicles. Furthermore, the simplicity of the invention in construction and application has eliminated a very considerable cost factor in such power plants, otherwise requiring added features of oil coolers, with connections to engine or other cooling systems.

Although the description herewith covers only one of the preferred forms of the invention, it is to be understood that numerous modifications may be made in the construction as disclosed without departing from the spirit of the invention or from the scope of the appended claims.

I claim:

1. In fluid turbine drive transmitting mechanisms, an engine, a load shaft, a turbine drive device adapted to transmit variable slip torque between said engine and said load shaft while generating heat proportional to slip therebetween, means effective to circulate a moving body of fluid under pressure to the turbine drive working space of said device, and cooling means including a rotating member driven by said engine and surrounding said device effective to interchange heat from said moving fluid body to an external body of air circulated by rotation of said member.

2. In a motor vehicle, an engine, a load shaft, a rotatable drum driven by said engine the external surface of which is exposed to air masses set in motion by operation of said engine, a fluid turbine clutch having elements housed within said drum, adapted to transmit variable torque between said engine and said load shaft, said elements forming a vaned working space, means coupling said drum to one of said turbine clutch elements, fluid pressure means adapted to circulate a moving body of fluid under pressure in the space between the said drum and said elements and circulate said body of fluid through the working space of said clutch, and air circulation means energised by rotation of said engine effective to cool the moving body of fluid circulated by said fluid pressure means in the said space between the said drum and said elements.

3. In cooling systems for fluid turbines adapted to transmit variable torque, an engine, a power shaft, driving mechanism arranged to be driven by said shaft, a vaned fluid turbine clutch coupling said shaft and said mechanism, a vaned working space between the elements of said clutch, a drum member driven directly by said engine coupled to one of said elements and enclosing said clutch, fluid pressure circulating means arranged to maintain a body of fluid under pressure within said working space by delivery thereof to the confined space between said member and said clutch elements, a casing surrounding said elements and said member, directive vanes in said casing, and air circulation means energised by rotation of said member within said casing and guided by said directive vanes effective to extract heat generated by the action of said clutch in said fluid by conduction through the material of said member.

4. A motor vehicle, an engine, a load shaft drive transmitting mechanism therebetween including a fluid turbine clutch having input and output elements, a drum surrounding said elements coupled to one of said elements and rotatable at varying speed ratios with respect to the other of said elements, a casing member located external to said drum and exposed to air masses set in motion by the movement of the vehicle, and radial slots in said casing open rotationally in the direction of rotation of said drum whereby rotation of said drum draws air into the space between said drum and said casing and ejects it therefrom.

5. In motor vehicles, an engine, a rotatable drum driven by said engine, a vaned turbine clutch adapted to transmit the drive of said engine through coacting rotors said clutch having a vaned working space, a fluid body circulating within said drum and through said working space, a variable speed transmission unit associated with said clutch, a casing for said unit, bearings for the driving elements of said unit mounted in said casing, a fluid pressure circulation system for said fluid body comprising a pump driven by said engine, pressure passages leading from said pump to the space within said drum and to the working space of said turbine clutch, pressure relief passages leading therefrom to the bearings of said unit, and the reservoir formed by the said casing wherein a temperature drop in the said fluid body occurs, said pump utilizing the said casing as a suction supply source, and means effective to extract heat from said body of fluid energised by rotation of said engine and said drum.

6. In motor vehicles, an engine, a load shaft, a clutch casing supported on said engine, a fluid clutch for transmitting the power of said engine with variable torque to said load shaft, a removable closure pan for said clutch casing, and radial louvers in said pan formed of the material thereof and open in the normal direction of rotation of the elements within the said casing for assisting the flow of cooling air within the said casing.

7. In power transmitting devices, an engine, a load shaft, a clutch casing structure supported on said engine, a drum member within said structure, a clutch within said member for transmitting the power of the engine with variable torque to said load shaft, embodying coacting turbine rotors vaned to form a fluid working space between them, one of said rotors being coupled to said engine by said member, a moving body of fluid circulating to and from said working space capable of absorbing heat generated by slip between said rotors and movable under pressure within the space between said rotors and said drum to said fluid working space, and radial louvers in said structure opening in the normal direction of rotation of said drum for assisting the flow of cooling air within the said casing.

8. In motor vehicles, an engine, a load shaft, a variable speed transmission unit, a casing for said unit comprising a fluid reservoir, a vaned fluid turbine drive device coupling said engine and said unit, said device having a vaned working space, pump means effective to circulate a moving body of fluid from said casing to said working space from whence said body passes to the bearings of said unit and returns to said casing, and cooling means in the line of flow of said fluid between said pump and said working space adapted to cool said body of fluid heated by slip of said device, said means being driven by said engine.

9. In fluid turbine drive devices, an engine, a drum driven thereby, a load shaft, a fluid reservoir, a fluid circulating system communicating with said reservoir, a fluid turbine clutch adapted to couple said drum with said load shaft, and a moving body of fluid in said system effective to fill the working space of said device while said engine is operating, also effective to transmit slip generated heat of said device to a rotating body of air set in motion by rotation of said drum, by means of conduction through the wall section of said drum.

10. In power devices for motor vehicles, an engine, a load shaft, a drum driven by said engine, a fluid turbine clutch located within said drum and adapted to transmit the torque of the engine at variable slip ratios from said drum to said shaft, a fluid chamber between said drum and said clutch, a vaned fluid working space included in said clutch, pump equipped circulation means effective to maintain a moving body of fluid under pressure in said chamber and flowing to said working space, said moving body of fluid being translated radially outward through said chamber and inward to said working space to relief passages leading back to the suction side of said means, and air circulation means energised by rotation of the said engine effective to extract heat from said fluid body through the material of said drum.

11. In motor vehicles, an engine, a mechanism driven by said engine embodying a variable speed transmission unit associated with a fluid turbine clutch comprising coacting rotors having a vaned fluid working space, bearings supporting said rotors and supporting the variable speed elements of said unit, a fluid circulating system including lubrication passages for said rotor bearings and for said transmission bearings, lubricant circulation means effective to maintain a body of fluid under a constantly active pressure head in said working space and in the bearings for said rotor and in passages leading from said working space to the bearings of said unit, a spent-pressure reservoir from which a pump draws fluid to supply said system, and heat exchanging means effective to extract heat from said body of fluid in accordance with the speed of rotation of said engine.

12. In motor vehicles, an engine, a driving drum driven by said engine, a load shaft, a variable speed transmission unit, a fluid turbine clutch having a vaned working space and coupling said shaft and said drum through said transmission unit at varying torques, a fluid circulation system for filling the said working space comprising a pump, a reservoir, a pressure space enclosed within said drum and connecting pressure and suction passages, a moving fluid body circulatable in said system having constant volume and pressure to completely fill the working space of said turbine clutch and the pressure space of said drum at all times, while providing fluid flow from said working space to said bearings of said unit at all times when said engine is rotating, and cooling means effective to extract heat from said fluid body through the wall of said drum at all times when said engine is rotating.

13. In power devices, an engine, a load shaft, a fluid turbine clutch adapted to couple said engine and said shaft at variable torque ratios, a rotatable drum housing said clutch coupling said engine and said shaft and containing a constantly pressure-circulated oil body effective to furnish the working fluid for said clutch, means circulating said oil body under pressure within the said drum to said turbine clutch and cooling means made operative by rotation of said drum to cool the said oil body by circulation of a moving column of air across the external surface of said drum.

14. In power devices, an engine, a load shaft, gear elements associated with said load shaft, a fluid turbine clutch having input and output rotors and adapted to transmit drive from said engine to said load shaft, said input rotor being operable at variable speed with respect to the speed of said engine, bearings for said shaft and said elements, fluid pressure producing means for constantly providing working pressure to said clutch and to lubricate said bearings and said gear elements, a moving body of fluid circulated by said means for furnishing working fluid to said clutch, and means effective to extract the heat of friction generated by said clutch and by said bearings from said body of fluid.

15. In a motor vehicle, an engine, a load shaft, a rotatable drum driven by said engine the external surface of which is exposed to air masses set in motion by operation of said engine, the internal surface of which is adapted to serve as a guide for a moving film of fluid, a fluid turbine clutch having elements housed within said drum, adapted to transmit variable torque between said engine and said load shaft, said elements forming a vaned working space, means coupling said drum to one of said turbine elements, fluid pressure means adapted to circulate a moving body of fluid under pressure in the space between the said drum and said elements and circulate said body of fluid through the working space of said clutch, and air circulation means energised by rotation of said engine effective to cool the moving body of fluid circulated by said fluid pressure means in the said space between the said drum and said elements.

16. In power mechanism, an engine and a load shaft coupled by a fluid clutch device comprising facing vaned turbine wheels enclosing a fluid working space, a drum driven by said engine enclosing said device and driving one of said wheels, the inner surface of said drum affording a smooth flow surface for fluid under pressure flowing to said working space, a casing for said device enclosing said drum, a removable closure pan for said casing, substantially radial apertures in said pan located forward of and to the rear of the transverse center plane of said device, and guide slots associated with said apertures related to the direction of rotation of said drum such that an air mass is drawn into the casing from the forward apertures and ejected from the rearward apertures of said closure pan.

CARROLL K. LENNING.